Patented Jan. 20, 1953

2,626,255

UNITED STATES PATENT OFFICE 2,626,255

ZIRCONIUM PIGMENTS

Warren Barnett Blumenthal, Niagara Falls, N. Y., assignor to National Lead Company, New York, N. Y., a corporation of New Jersey No Drawing. Application March 15, 1950, Serial No. 149,903

10 Claims. (Cl. 260—147)

The present invention relates to a new class of color pigments, and particularly to zirconium compounds of soluble acid dyestuffs, of distinctive chemical structure.

This application is a continuation-in-part of Serial No. 649,754, filed February 23, 1946, now abandoned. In U. S. Patent No. 2,492,959, granted January 3, 1950, I have described the reaction of hydrous zirconia hydro gels with basic dyes with the formation of pigments.

The addition of inorganic constituents to an organic dyestuff to produce a pigment possesses certain well known advantages and also well defined limitations. Generally, the inorganic constituents have been employed either as extenders or as substrates upon which coloring principles have been absorbed or precipitated. Also, an inorganic constituent is used as a precipitating agent to fix the dye upon the lake substrate.

Color lakes are defined as "insoluble compounds produced by the absorption or precipitation of a coloring principle on an inert and insoluble base." Toners are "organic pigments containing no inorganic pigments or inorganic carrying bases." In the precipitation of metallic lakes and toners, the "metallic salts which are commonly used include those of barium, calcium, aluminum, tungsten, molybdenum, lead, tin and strontium." A typical manufacturing procedure is to add an aqueous solution of barium and aluminum chlorides to a slurry of alumina hydrate and an acid dyestuff. The dyestuff is precipitated practically quantitatively onto the alumina hydrate, forming a lake pigment. Acid dyes are "organic coloring agents in which the dye-base takes the place of the acid constituent of a salt." In the lake-making art, acid dyes in common use are generally soluble coloring agents containing one or more carboxylic or sulfonic acid groups or both. Lake pigments of this type find a wide application in the manufacture of printing inks, cosmetics and other color compositions. In such a lake composition, the function of the barium and aluminum salts is not to form insoluble compounds with dyestuff for, in general, the barium and aluminum compounds of acid dyestuffs are not insoluble materials. Their action is to impart adsorptive qualities to the substrate, viz., the alumina hydrate. While the alumina hydrate lakes in common use have been widely accepted as valuable coloring agents, they have some peculiar limitations: The substrate acts as a diluent and limits the color strength which can be developed from any dyestuff; moreover, if more than certain proportions of dyestuff are precipitated onto a substrate, the lake will often "bleed" into water; furthermore, the surplus dyestuff may have no value in increasing the color strength of the lake.

In accordance with the principles of the present invention, water soluble acid dyestuffs, that is, dyestuffs containing one or more carboxyl or sulfonic acid groups, are caused to react chemically in highly acidic solutions with a water soluble salt of zirconium such as the oxychloride, oxynitrate and the like, i. e. the zirconyl salts, with the production of intensely colored, insoluble, non-bleeding pigments which are basic zirconyl salts in which the coloring principle of the dye acts as a colored anion. This chemical characteristic of formation of colored, insoluble, non-bleeding pigments formed as the reaction product of soluble zirconium salts and acid dyestuffs, distinguishes zirconium salts from the case where soluble salts of other metals are used as inorganic additions in the usual production of lakes and toners. For example, the toners of most acid dyes cannot be made with aluminum salts. When these toners can be made, they are neither insoluble nor non-bleeding.

In accordance with the present invention, the use of zirconium salts which are highly acidic in water solution in pigment-making yields unique products in that the zirconium forms insoluble compounds with the dyestuff, of definite chemical compositions, and offering advantages to be described. Other metals do not react chemically to form insoluble compounds with acid dyestuffs.

By the novel action of salts of zirconium in acidic solution, which eliminates the substrate as an essential constituent of pigment compositions of acid dyes, the maximum color strengths of dyestuffs are realized, and greater freedom is attained for the use of a wide range of physical and chemical conditions of precipitating the coloring matter, for substrates frequently impose sharp limitations on the range of conditions under which lakes may be prepared. The products of the present invention, as contrasted with the usual aluminum products, are insoluble and non-bleeding, possess full pigmenting strength, are softer and are more readily ground and worked, all properties which render them more desirable than the usual aluminum products.

These zirconyl compounds form readily in acid solutions at a pH below 3.0 with dyes of all classes whether they be nitro or nitroso dyestuffs, azo dyestuffs, diazo dyestuffs, phenylmethane dyestuffs, dyestuffs of the azine, indamine, xanthane, thiazole, quinoline, hydroxy ketone or other type of dye provided only that the dyestuff be an acid dye, that is, contain one or more carboxyl groups or sulfonic acid groups.

Although any zirconium salt capable of yielding a zirconyl radical or ion on hydrolysis and therefore highly acidic in aqueous solution, is suitable for use in manufacturing the insoluble, highly colored zirconium pigments, the zirconium oxychloride of commerce, because of its low cost, relatively high solubility and convenient basicity, is preferred to other water soluble zirconium salts. In general, it may be considered that the acid dyes comprise an organic coloring agent in which the dye base takes the place of the acid constituent of a salt; that is, that there is probably present in solution a colored dye radical corresponding to an ion of negative charge capable of combining by double decomposition with the zirconyl cation of the water soluble zirconium salt. Whenever reaction occurs with a dye containing a carboxyl group or a sulfonic acid group, the highly colored dye radical is precipitated as a salt of the zirconyl radical.

The following is a partial list of such dyes and the molecular ratios in which they react with zirconyl salts. All of the compounds are basic zirconyl salts; that is, salts containing one or more $Zr_2O_3^{++}$ radicals. They may also contain the radical $ZrO^{++}$, and some dyes form two compounds with zirconium containing different proportions of $Zr_2O_3^{++}$ and $ZrO^{++}$ radicals.

| Dye | Color Index No. | Molar Reacting Ratio of Zr (as $ZrOCl_2$) with Dyestuff |
|---|---|---|
| 1. Amaranth | 184 | 5:2. |
| 2. Acid Green L | 666 | 5:3. |
| 3. Eosin | 768 | 4:5. |
| 4. Erioglaucine | 671 | 3:1, also 5:2. |
| 5. Fast Lt. Yellow 3G | 636 | 1:1. |
| 6. Orange II | 151 | 1:1, also 1:2. |
| 7. Ponceau 2R | 79 | 1:2. |
| 8. Quinoline Yellow S | 801 | 3:2. |
| 9. Tartrazine | 640 | 5:2. |
| 10. Uranine | 766 | 1:2. |

Although most of the examples given below employ $ZrOCl_2 \cdot 8H_2O$, the zirconium oxychloride, as the source of zirconium, it will be understood that the invention is not restricted thereto since the following examples are merely illustrative of the principles of invention rather than limitative thereof:

Example I 10 lbs. of Acid Green (Color Index No. 666) is dissolved in 70 gals. of water at 122° F. Into this is run slowly a solution containing 15 lbs. of zirconium oxychloride in 20 gals. of water and possessing a pH of 1 to 1.5. The pH of the slurry is raised from a pH of about 1 to a pH of about 3.5 with sodium hydroxide and the slurry is stirred ten minutes and filtered. The precipitate is washed and dried. An intense green toner is obtained having a soft texture and useful pigment properties. The compound is apparently $ZrO((Zr_2O_3)_3(C_6H_5C(C_6H_4NC_2H_5CH_2C_6H_4SO_3)_2Cl)_4) \cdot 12H_2O$

Example II 10 lbs. of Fast Light Yellow 3G (Color Index No. 636) is dissolved in 70 gals. of water at 122° F. Into this is run slowly a solution containing 15 lbs. of zirconium oxychloride in 20 gals of water. The slurry, at a pH adjusted upwardly about 3.5 is stirred 10 minutes and filtered. The precipitate is washed and dried. A yellow toner of high tinctorial strength, soft texture, and clean, brilliant shade is obtained. The compound is apparently $Zr_2O_3(C_6H_5N_2C_2CH_3COHN_2C_6H_4SO_3)_2 \cdot 6H_2O$.

Example III

In place of the Fast Light Yellow 3G of Example II, use an equal weight of Tartrazine Yellow (Color Index No. 640). Before filtering, the pH is raised to about 3.5 and an emulsion of 10.3 gm. of 00 lithographic varnish in 10.3 lbs. of water, using 0.343 lb. sodium oleate as an emulsifying agent is added. After stirring for a short time, filter, wash and dry the precipitate. A dry color is obtained of soft texture and high strength and brilliance. The color compound is apparently $ZrO(Zr_2O_3)_2(SO_3C_6H_4N_2C_2COCOHN_2C_6H_4SO_3)_2$ The reaction occurs generally with acid dyes and the following are typical:

Erioglaucine (#671),
 $SO_3C_6H_4C(C_6H_4NC_2H_5CH_2C_6H_4SO_3NH_4)_2$
Orange II (#151), $NaO_3SC_6H_4N_2C_{10}H_6OH$
Quinoline Yellow (disulfonate) (#800),
 $C_6H_4C_3O_2HC_9NH_4(SO_3Na)_2$
Uranine (#766), $NaOC_6H_3OC_6H_3OCC_6H_4CO_2Na$
Alizarine Cyanine G Extra (#1078), $C_{28}H_{20}N_2O_8S_2Na_2$
Alizarine Red S (#1034), $C_{14}H_7O_7SNa \cdot H_2O$
Buffalo Black NBR (#246), $C_{22}H_{14}N_6O_9S_2Na_2$
Durol Black B (#307), $C_{36}H_{23}N_5O_6S_2Na$
Erie Fast Orange CG (#621), $C_{28}H_{16}N_4O_{12}S_4Na_4$
Erie Violet 3R (#394), $C_{32}H_{22}N_6O_8S_2Na_2$
Indigotine Conc. (#1180), $C_{16}H_8N_2O_8S_2Na_2$
Lake Scarlet R (#79), $C_{18}H_{14}N_2O_7S_2Na_2$
Resorcine Dk. Brown (#235), $C_{20}H_{10}N_4O_8S_2Na_2$ The products of the present invention can also be prepared in the presence of emulsified agents to enhance the tinctorial strength as, for instance, using oleic acid emulsions as follows:

Example IV 10 lbs. of Tartrazine Yellow is dissolved in 70 gals. of water at 122° F. 1.2 lbs. of oleic acid is emulsified in 10 gals. of water using 0.12 lb. of triethanolamine as an emulsifying agent. The emulsion is added slowly to the Tartrazine Yellow solution, simultaneous with the addition of a solution of 15 lbs. of zirconium oxychloride in 20 gals. of water. The mix, at an adjusted pH of below 3.5, is stirred briefly and filtered, and the precipitate is washed and dried. A yellow toner is obtained of considerably higher tinctorial strength than if no emulsion is used.

The above zirconyl compounds of acid dyes may be used as toners as they are organic pigments containing no inorganic pigments or inorganic carrying bases or may be prepared as lakes, i. e., insoluble compounds produced by the absorption or precipitation of a coloring principle on an inert and insoluble base. As an example, the zirconyl salt of the dye may be prepared and absorbed on the lake base as, for instance, aluminum hydroxide, or prepared in the presence of the inert base. A lake may be prepared as follows:

Example V 12.3 lbs. of Tartrazine Yellow is dissolved in 14 gals. of water and run slowly into 16 lbs. of zirconium oxychloride which has been dissolved in 60 gals. of water at 122° F. producing a solution of pH of about 1.5 at which the dye precipitated. A slurry of 83 lbs. of 17% alumina hydrate pulp, dispersed in 35 gals. of water, is added to the precipitated dye. An additional 1 lb. of zirconium oxychloride, dissolved in 1 gal. of water, is added. After stirring a short time, the slurry is filtered and the precipitate is washed and dried. A lake of high tinctorial strength and extreme insolubility in water is obtained.

The lakes and toners of the present invention need not be dried but can be "flushed" to produce oil pastes or can be used as pulp colors.

*Example VI*

In order repeatedly to obtain maximum yield of dye pigment of exact reproducible shade, the dye is best precipitated under the same conditions of pH. As the zirconium oxychloride upon hydrolysis and upon reaction with the dye, generates free acid (HCl) in the solution, the pH of the reaction mixture tends to fall with the progress of the reaction. It is preferred, therefore, to add the alkali during the precipitation of the dye pigment in amounts and at a rate sufficient to maintain the pH of the reaction environment at a constant and low level, always lower than pH 3. The following example illustrates this phase of the invention.

A solution of 120 grams of Erioglaucine (Color Index 671) in 4000 cc. of water was treated with sufficient hydrochloric acid to produce a pH of 2.8. To this was slowly added 3200 cc. of an aqueous solution containing 330 grams of zirconium oxychloride ($ZrOCl_2.8H_2O$) the pH of which had been raised to 2.55 by addition of sodium carbonate (65 g. $Na_2CO_3$ in 300 cc. water). The temperature of the reacting solutions and resulting slurry was maintained at about 95° C. The addition was made over a period of about 10 minutes and the pH in the slurry during addition was maintained at pH 2.8 by small increments of a dilute caustic soda solution or other alkali. Upon completion of the reaction, the slurry was stirred an additional 5 minutes at 95° C., then chilled to 50° C. by addition of cold water adjusted to a pH of 2.8 with HCl, filtered and washed. A yield of about 265 grams of dye pigment was obtained the Erioglaucine content of which was approximately 45%.

The zirconium dye compounds are quite stable, and are equal to or better than alumina hydrate pigments in resisting the destructive agencies of light, soap and alkali, and the solvent action of water, alcohol and oleaginous vehicles. The zirconium dye compounds are useful as pigment toners, but may also be precipitated in the presence of substrates, forming lakes having valuable pigment properties.

In certain of the examples above, dispersing or coating agents are employed in addition to the dye and soluble zirconium salt in order to enhance the tinctorial strength and produce the desirable qualities associated with the employment of such emulsions.

The zirconyl and basic zirconyl derivatives of the acid dyes are useful as toners because of their stability, insolubility, non-bleeding characteristics, and because they are soft, easily ground, easily flushed compounds containing no substrate.

It will be understood that the term "zirconyl" applies to the radical $ZrO^{++}$ derived from the oxysalts, such as zirconium oxychloride, as for instance the so-called zirconium oxychloride of commerce, $ZrOCl_2.8H_2O$.

What is claimed is:

1. The method of making a dye pigment from a water soluble acid dye containing an acid group selected from acid groups consisting of carboxalate and sulfonate and a water soluble zirconium salt which comprises combining the dye in aqueous solution with sufficient of a water soluble zirconyl salt at a pH of less than 3 whereby the dye is precipitated as a water insoluble compound of the dye and the basic zirconyl radical of the zirconium salt.

2. The method of making a dye pigment from a water soluble acid dye containing an acid group selected from acid groups consisting of carboxalate and sulfonate and a water soluble zirconium salt which comprises combining the dye in aqueous solution with sufficient zirconyl chloride at a pH of less than 3 whereby the dye is precipitated as a water insoluble compound of the dye and the basic zirconyl radical of the zirconium salt.

3. The method of making a dye pigment from a water soluble acid dye containing an acid group selected from acid groups consisting of carboxalate and sulfonate and a water soluble zirconium salt which comprises combining the dye in aqueous solution with sufficient of a water soluble zirconyl salt in the presence of hydrochloric acid sufficient to produce a pH of less than 3 whereby the dye is precipitated as a water insoluble compound of the dye and the basic zirconyl radical of the zirconium salt.

4. The method of making a dye pigment from a water soluble acid dye containing an acid group selected from acid groups consisting of carboxalate and sulfonate and a water soluble zirconium salt which comprises combining the dye in aqueous solution with sufficient of a water soluble zirconyl salt at a pH of less than 3 whereby the dye is precipitated as a water insoluble compound of the dye and the basic zirconyl radical of the zirconium salt and separating the dye pigment from the solution.

5. The method of making a dye pigment from a water soluble acid dye containing an acid group selected from acid groups consisting of carboxalate and sulfonate and a water soluble zirconium salt which comprises combining the dye in aqueous solution with sufficient of a water soluble zirconyl salt at a pH of less than 3 whereby the dye is precipitated as a water insoluble compound of the dye and the basic zirconyl radical of the zirconium salt, raising the pH of the reaction mass to about 3.5 and separating the dye pigment.

6. The method of making a dye pigment from a water soluble acid dye containing an acid group selected from acid groups consisting of carboxalate and sulfonate and a water soluble zirconyl salt which comprises mixing an aqueous solution of the dye with sufficient of an aqueous solution of a water soluble zirconyl salt whereby the dye is precipitated as a water insoluble compound of the dye and the basic zirconyl radical and continuously adding alkali to the reaction mixture during the reaction to maintain a relatively constant pH in the mixture and at a level below pH 3.

7. The method of making a dye pigment from a water soluble acid dye containing an acid group selected from acid groups consisting of carboxalate and sulfonate and a water soluble zirconyl salt which comprises mixing an aqueous solution of the dye with sufficient of an aqueous solution of a water soluble zirconyl salt whereby the dye is precipitated as a water insoluble compound of the dye and the basic zirconyl radical and continuously adding alkali to the reaction mixture during the reaction to maintain a relatively constant pH in the mixture and at a level below pH 3 and then removing the dye pigment.

8. The method of making a dye pigment from a water soluble acid dye containing an acid group selected from acid groups consisting of carboxalate and sulfonate and zirconyl chloride which comprises mixing an aqueous solution of the dye with sufficient of an aqueous solution of zirconyl chloride to precipitate the dye as a water insoluble compound of the dye and the basic zirconyl radical and continuously adding alkali to the reaction mixture during the reaction to maintain a relatively constant pH in the mixture and at a level below pH 3.

9. The method of making a dye pigment from a water soluble acid dye containing an acid group selected from acid groups consisting of carboxalate and sulfonate and a water soluble zirconyl salt which comprises mixing an aqueous solution of the dye with sufficient of an aqueous solution of a water soluble zirconyl salt in the presence of hydrochloric acid whereby the dye is precipitated as a water insoluble compound of the dye and the basic zirconyl radical and continuously adding alkali to the reaction mixture during the reaction to maintain a relatively constant pH in the mixture and at a level below pH 3.

10. A dye pigment comprising the water insoluble reaction product of a water soluble zirconyl salt and an acid dye containing an acid group selected from the acid group consisting of carboxalate and sulfonate.

WARREN BARNETT BLUMENTHAL.

REFERENCES CITED

The following references are of record in the file of this patent:

UNITED STATES PATENTS

| Number | Name | Date |
|---|---|---|
| 2,220,397 | Crossley et al. | Nov. 5, 1940 |
| 2,259,736 | Crossley et al. | Oct. 21, 1941 |
| 2,492,959 | Blumenthal | Jan. 3, 1950 |

OTHER REFERENCES

Georgievics et al.: "Dye Chemistry," 1920, page 2.